(12) United States Patent
Guionnet et al.

(10) Patent No.: US 11,751,273 B2
(45) Date of Patent: Sep. 5, 2023

(54) ACTIVATION OR DEACTIVATION OF A VIRTUAL SUBSET OF A NETWORK DEDICATED TO A SERVICE FOR A TERMINAL

(71) Applicant: ORANGE, Issy-les-Moulineaux (FR)

(72) Inventors: Chantal Guionnet, Chatillon (FR); Sylvie Jumpertz, Chatillon (FR); Delphine Guegan, Chatillon (FR); Catherine Benguigui, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 226 days.

(21) Appl. No.: 17/297,748

(22) PCT Filed: Nov. 29, 2019

(86) PCT No.: PCT/FR2019/052848
§ 371 (c)(1),
(2) Date: May 27, 2021

(87) PCT Pub. No.: WO2020/109743
PCT Pub. Date: Jun. 4, 2020

(65) Prior Publication Data
US 2022/0104305 A1   Mar. 31, 2022

(30) Foreign Application Priority Data
Nov. 29, 2018   (FR) ...................................... 1872056

(51) Int. Cl.
*H04W 4/00*   (2018.01)
*H04W 76/22*   (2018.01)
(Continued)

(52) U.S. Cl.
CPC ......... *H04W 76/22* (2018.02); *H04L 41/5054* (2013.01); *H04L 67/51* (2022.05);
(Continued)

(58) Field of Classification Search
CPC ........ H04W 16/04; H04W 4/029; H04L 67/60
See application file for complete search history.

(56) References Cited

U.S. PATENT DOCUMENTS 9,817,766 B1 *  11/2017  Si ........................... G06F 3/0685
10,863,556 B2 *  12/2020  Lau ....................... H04W 48/10
(Continued)

FOREIGN PATENT DOCUMENTS

WO   2017212162 A1   12/2017
WO   2019043324 A1   3/2019

OTHER PUBLICATIONS

English translation of the Written Opinion of the International Searching Authority dated Mar. 30, 2020 for corresponding International Application No. PCT/FR2019/052848, filed Nov. 29, 2019.
(Continued)

*Primary Examiner* — Chi H Pham
*Assistant Examiner* — Elisabeth Benoit Magloire
(74) *Attorney, Agent, or Firm* — David D. Brush; Westman, Champlin & Koehler, P.A

(57) ABSTRACT

A method for activation or deactivation, for a terminal, of a virtual subset of a telecommunications network referred to as a "network slice", dedicated to a service. The telecommunications network includes a plurality of network slices. The method includes: acquiring at least one piece of context data of a user; and activating or deactivating at least one network slice among the plurality of network slices on the basis of the previously acquired piece of context data.

9 Claims, 2 Drawing Sheets

(51) Int. Cl.
  *H04W 4/029* (2018.01)
  *H04L 41/5054* (2022.01)
  *H04W 16/04* (2009.01)
  *H04L 67/51* (2022.01)
  *H04L 67/60* (2022.01)
(52) U.S. Cl.
  CPC ............ *H04L 67/60* (2022.05); *H04W 4/029* (2018.02); *H04W 16/04* (2013.01)

(56) References Cited

U.S. PATENT DOCUMENTS

| | | | |
|---|---|---|---|
| 2017/0332421 | A1 | 11/2017 | Sternberg et al. |
| 2018/0220008 | A1* | 8/2018 | Reith .................... H04L 47/821 |
| 2018/0249441 | A1* | 8/2018 | Ryoo .................... H04W 48/16 |
| 2018/0332523 | A1* | 11/2018 | Faccin .............. H04W 36/0033 |
| 2018/0352592 | A1* | 12/2018 | Zhu ....................... H04W 76/11 |
| 2018/0359337 | A1* | 12/2018 | Kodaypak ........... H04L 41/0897 |
| 2018/0368053 | A1 | 12/2018 | Wei et al. |
| 2019/0166523 | A1* | 5/2019 | Shaw .................... H04W 76/16 |
| 2020/0170052 | A1* | 5/2020 | Yang .................... H04W 28/26 |
| 2021/0036920 | A1* | 2/2021 | Erman ................ H04L 41/0894 |
| 2021/0112513 | A1* | 4/2021 | Chun .................... H04W 48/18 |

OTHER PUBLICATIONS

International Search Report dated Mar. 24, 2020 for corresponding International Application No. PCT/FR2019/052848, Nov. 29, 2019.
Written Opinion of the International Searching Authority dated Mar. 24, 2020 for corresponding International Application No. PCT/FR2019/052848, filed Nov. 29, 2019.

* cited by examiner

[Fig. 1]
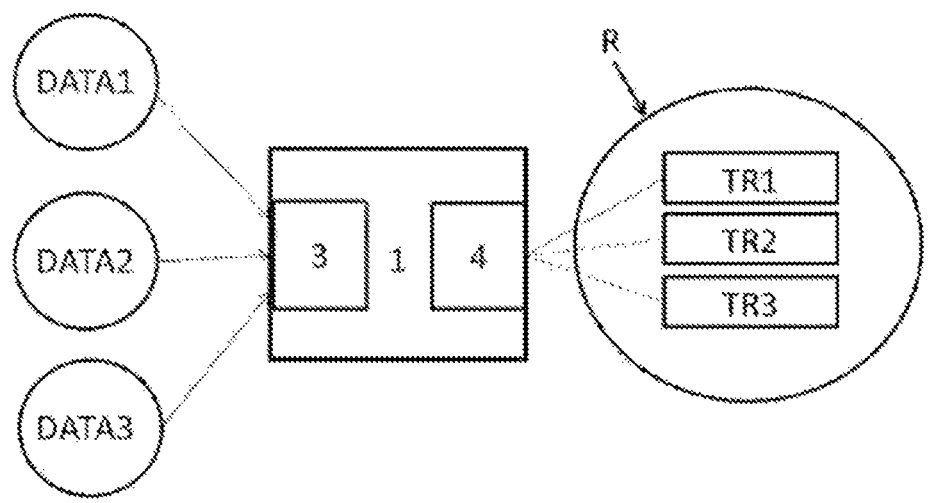
[Fig. 2]
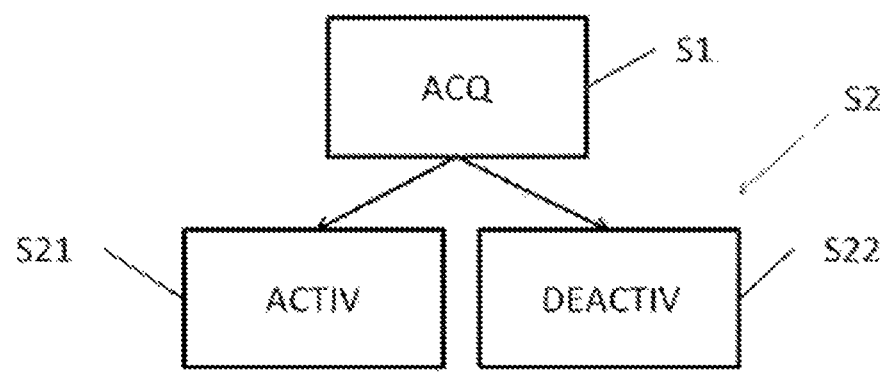

[Fig. 3]
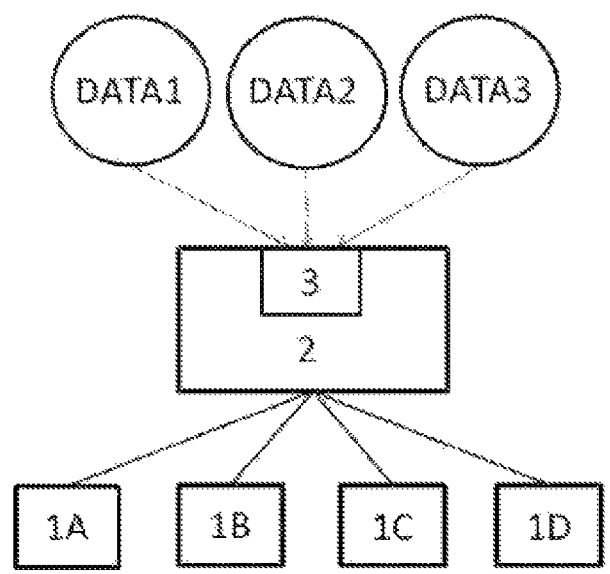

ACTIVATION OR DEACTIVATION OF A VIRTUAL SUBSET OF A NETWORK DEDICATED TO A SERVICE FOR A TERMINAL

CROSS-REFERENCE TO RELATED APPLICATIONS

This Application is a Section 371 National Stage Application of International Application No. PCT/FR2019/052848, filed Nov. 29, 2019, the content of which is incorporated herein by reference in its entirety, and published as WO 2020/109743 on Jun. 4, 2020, not in English.

TECHNICAL FIELD

The disclosure relates to the field of telecommunications networks. In particular, the disclosure relates to "5G Slicing".

PRIOR ART

In the past, the architecture of mobile telecommunications networks has been standardized. This is particularly the case with what are called the "2G", "3G", and "4G" mobile networks, whose different telecommunications network architectures are conventionally based on very specific equipment dedicated to certain precise functionalities, whether at the network access level or the core network level.

The lack of flexibility and scalability inherent in this type of conventional architecture has led to considering the adoption of more flexible architectures for the next generation of mobile networks, known as "5G", in order to be able to respond quickly to extremely diverse demands in terms of traffic or quality of service.

5G is a whole new context for networks, due to its strong convergence with computing. It was designed with software in mind. This translates into a virtualization of network functions, meaning the software implementation of capabilities that were previously physically integrated into the infrastructures themselves. In practice, the two direct consequences are an "on demand" network, adaptable and controllable remotely and in real time.

This flexibility is reflected in a new concept: the "Slice". This solution is based on a technique of virtually slicing the network into sections ("network slicing").

When a customer, for example a service provider, specifies its network requirements with its carrier, it will state its operational requirements (QoS, cost, security . . . ) and its performance requirements (speed, latencies . . . ). The "Slice" is the personalized virtual private network satisfying this statement of requirements.

This is why, in 5G, two different ways of 5G slicing are discussed:
1) network side, and
2) client side (client—service providers)

The slice is a virtual private network. Today, operators are physically able to provide private networks by constructing them with physical infrastructure. The "virtual" implementation of the private network is understood on the client side to be an equivalent service rendered.

The network slice concept is intended to support communication services for specific needs, specific users, or specific terminals, by applying suitable means of traffic management.

A network slice comprises parameter values for configuring a virtual private network to meet the requirements of the services to be provided. The network slices deployed by an operator are not all composed of the same network parameter values, or even the same network parameters, as the idea is to adapt the architecture and the network slices to the usage requirements related to that network slice. A network slice thus makes it possible to meet user demand according to different functional, operational, and performance criteria, such as data transfer rate, latency, number of terminals connected, coverage, cost, etc.

For example, a network slice used in relation to IoT ("Internet of Things") services may require managing a large number of terminal connections but a rather low data transfer rate associated with each terminal. In another example, a service offered to business customers will instead require advanced security and availability parameters.

Currently, artificial intelligence does not allow complete and real-time adaptation of client-side network slices. This is why the initial plan is for the operators to build a few models of network slices on the network side (3-4) and the clients will use one of these models according to their needs.

Secondly, it is envisaged that the models can be partially modified, and that as a result, the client-side network slices can be adapted as needed to trigger the authorized partial modifications.

Ultimately, artificial intelligence will allow automated construction of network slices allowing real-time adaptation of the network slice on the client side. The terms here are "dynamic 5G slicing", as opposed to the "static 5G slicing" planned for the launch of 5G. In the case of static 5G slicing, a network management device of a service provider or client expresses its requirements for a given service in the form of a network slice. The network management device thus performs an allocation, also called an assignment, of the network slice to the service. The implemented service then uses the allocated network slice. And, when the service is not being implemented, the network slice remains allocated to it, implying a reservation of unused resources.

A user may subscribe to several services respectively provided by a plurality of network slices. Depending on their requirements in terms of services, he may wish to activate a particular network slice which corresponds in a satisfactory manner to his current or future requirements, in order to eventually connect to the telecommunications network and subsequently access the service provided by this slice of the network. The network slice dedicated to a service will be the object of an allocation/assignment when this new service is subscribed to, prior to the activation of this network slice purely in a context of potential use of the service.

The activation of a network slice thus makes it possible to activate resources only during the periods of time when the service will potentially be used.

TECHNICAL PROBLEM

It is known to perform such an activation and/or deactivation of network slices on the basis of predefined time data or calendar data, such as the day, hour, or more generally a specific date.

However, a user's situation is also likely to change based on other data, in particular data specific to him that cannot be predicted in advance. The automatic activation and/or deactivation of network slices based on time data is then not satisfactory in enabling the user to benefit from the network slice most likely to provide the service he needs.

The present disclosure aims to at least partially resolve these disadvantages.

In particular, the disclosure concerns the activation or deactivation of a slice of the network, advantageously automatically, in particular by taking into account a change of situation which is slightly or not at all predictable in advance, including a change of situation external to the network itself.

SUMMARY OF THE DISCLOSURE

A method is proposed for the activation or deactivation, for a terminal, of a virtual subset of a telecommunications network referred to as a "network slice", dedicated to a service, the telecommunications network comprising a plurality of network slices, the method comprising at least:
  a) acquiring at least one piece of context data of a user, and
  b) activating or deactivating at least one network slice among the plurality of network slices, on the basis of the previously acquired piece of context data.

Thus, the activation of a network slice on the basis of the context makes it possible to save resources at the network level because if no network slice is activated using a device of the network infrastructure, this device could be placed on standby and activated only during activation of a network slice that uses it.

In the case of a dynamic network slice, the assignment/allocation of the network slice to a service prior to its activation is not mandatory. The two stages can be carried out at the same time, thus supporting the dynamic character of the network slices.

According to one embodiment, a first network slice is activated beforehand for the terminal, prior to the implementation of a) of the method, a second network slice that is different from the first network slice being activated as well during b) of the method.

According to another embodiment, a first network slice is activated beforehand for the terminal, prior to the implementation of a) of the method, and the first network slice is deactivated during b) of the method.

According to another embodiment, the network slices each comprise different parameter values, the parameters being selected from the data transfer rate, the geographical coverage, the number of connected terminals, the level of security, the cost of the service, the latency, the quality of service, and the frequency used by the network slice.

According to another embodiment, the piece of context data is a piece of geolocation data of the user.

According to another embodiment, the piece of context data is a piece of data associated with an activity of the user.

According to another embodiment, the piece of context data is acquired automatically during a) of the method.

Also proposed is a terminal for the activation and or deactivation of a virtual subset of a telecommunications network referred to as a "network slice", dedicated to a service, the telecommunications network comprising a plurality of network slices, the terminal comprising:
  a context data reader suitable for acquiring at least one piece of context data of a user, and
  an activation/deactivation member suitable for activating or deactivating at least one network slice among the plurality of network slices, on the basis of the previously acquired piece of context data.

Also proposed is a device for supervising access for the activation and or deactivation of a virtual subset of a telecommunications network referred to as a "network slice", dedicated to a service, the telecommunications network comprising a plurality of network slices, the device for supervising access being in communication with a plurality of terminals and comprising a context data reader suitable for acquiring at least one piece of context data of a user, the device for supervising access being configured to activate or deactivate a network slice for the plurality of terminals on the basis of the previously acquired piece of context data.

Also proposed is a computer program comprising program code instructions for executing the of the method according to the disclosure.

Also proposed is a non-transitory storage medium readable by a terminal, on which the code instructions of a computer program are stored according to the disclosure.

BRIEF DESCRIPTION OF DRAWINGS

Other features, details and advantages of the disclosure will become apparent from reading the following detailed description, and from analyzing the accompanying drawings, in which:

FIG. 1 is a simplified diagram of a terminal and an access device associated with first, second, and third network slices according to a first embodiment;

FIG. 2 is a simplified diagram of a method for the activation and/or deactivation of a network slice of FIG. 1; and FIG. 3 is a simplified diagram of a device for accessing a telecommunications network, comprising a supervision interface according to a second embodiment.

DESCRIPTION OF EMBODIMENTS

The drawings and description below contain, for the most part, elements that are definite in nature. They can therefore serve not only to provide an understanding of the disclosure, but they can also contribute to its definition, where appropriate.

Assignment or allocation of a network slice to a service is understood to mean the act, when subscribing to a service, of determining a suitable network slice to be used when providing this service and assigning/allocating it to the user device for these upcoming uses of the service.

We will now refer to FIG. 1 which schematically illustrates a terminal 1 and an associated device for accessing a telecommunications network R, according to a first embodiment.

"Terminal" is broadly understood to mean any electronic or computer device that can be connected to the telecommunications network R, for example a server, a computer, a mobile phone, or the like. The terminal 1 may itself be connected to other electronic or computer devices.

An operator of the telecommunications network R can advantageously use virtualized functions to implement a plurality of slices on a single physical network infrastructure.

Such a technique of cutting the network into slices thus enables the operator of the telecommunications network R to create "customized" networks, capable of providing optimized solutions for widely varying needs with very diverse constraints in terms of functionalities and performance.

As illustrated in FIG. 1, the telecommunications network R can make available to the terminal 1 a first network slice TR1, a second network slice TR2, and a third network slice TR3. However, this embodiment is not limiting and the telecommunications network R may comprise a lower number of network slices, for example only two slices, or a higher number.

One or more network slices TR1, TR2, TR3 can thus be activated simultaneously or successively for the terminal 1.

Each network slice TR1, TR2, TR3 is suitable for providing a specific network service to a user.

Thus, a network slice TR1, TR2, TR3 is associated with a plurality of parameters. The values of the parameters are used to define the network service provided by each of the network slices. In particular, the number of parameters may vary depending on the user's needs.

"Parameter" is understood to mean a variable likely to influence the service obtained by the user and therefore provided by the network slice.

According to one embodiment, a parameter concerns a technical functionality of the network slice.

A parameter of a network slice may be selected from the data transfer rate, the geographical coverage of the service, the number of possible connections, the level of security, the latency, the quality of service, and the frequency(ies) used by the network slice.

According to another embodiment, a parameter concerns an operational or performance functionality specific to the user.

A parameter of a network slice may be selected from various requirements relating to the service provided to the user, such as the cost of the service for the user, the energy impact of the service, the ecological impact, the commercial impact expected by the user.

These examples of parameters are not limiting. In addition, a parameter may be selected from a combination or a function of the parameters indicated above or other parameters not mentioned.

The slices TR1, TR2, TR3 comprise at least one, advantageously several, different parameter values depending on the service respectively provided or to be provided using these slices.

For example, in the case of a remote medical consultation service requiring the use of telemedicine tools, a doctor may require different services depending on his situation (traveling, in the office) or the type of consultation to be carried out. A particularly suitable network slice among the plurality of network slices can thus be activated for the doctor's terminal.

The method for the activation and/or deactivation of a network slice, for or directed towards a terminal 1, is thus described, illustrated by [FIG. 2].

One or more network slices may be activated for the terminal 1 beforehand. Alternatively, no network slice is activated for the terminal 1 beforehand, prior to implementing the method according to the disclosure.

In a first step of the method S1, at least one piece of context data is acquired. Advantageously, a plurality of context data DATA1, DATA2, DATA3 is acquired.

The piece of context data may advantageously be acquired automatically, meaning without transmission from the user himself. In particular, it is not necessary to use a human/machine interface for this purpose.

The piece of context data may advantageously be acquired periodically, for example every hour, every thirty minutes, or even every ten minutes or every minute.

The context data may also be advantageously acquired in real time. The term "in real time" is understood to mean in particular as soon as the piece of context data is accessible or determined.

A piece of context data is advantageously a piece of data specific to the user.

According to one embodiment, the piece of context data is a piece of geolocation data. The piece of geolocation data may in particular come from a method of determining the position of the user or of another person, for example by GPS ("Global Positioning System") or by any other method.

As an example, in the case of a remote medical consultation service by a doctor, the piece of context data can make it possible to determine whether the doctor is in his office or is traveling outside the office, or to determine where the patient to be examined is located.

According to another embodiment, the piece of context data is a piece of data associated with a user activity. The data associated with an activity may come from a calendar.

More particularly, the piece of context data may be linked to the types of availability, or to the user's requirements. The piece of context data thus makes it possible to distinguish between several types of user activities. For example, the piece of context data can indicate whether a user's meeting is personal or work related, or indicate the type of business meeting expected.

For example, in the case of a remote medical consultation by a doctor, the piece of context data can come from the work calendar of the doctor, and can allow determining whether the doctor is about to hold a consultation, or, conversely, if the doctor does not have an appointment scheduled.

In addition, if a medical consultation is planned, the piece of context data can indicate whether it is a simple medical consultation, or a medical specialty consultation possibly requiring more specific medical or telemedicine tools and therefore specific network requirements.

According to another embodiment, the piece of context data is a piece of data associated with the devices accessible by the terminal 1.

According to another embodiment, the piece of context data is a piece of data indicating a weather condition of the location where the terminal 1 is located.

Of course, the implementations relating to the piece of context data are not limiting and other context data are possible.

In a second step of the method S2, at least one network slice among the plurality of network slices TR1, TR2, TR3 is activated or deactivated on the basis of the previously acquired piece of context data.

A function, called the synchronization function, is used to determine which network slice is to be activated or deactivated.

For this purpose, the synchronization function takes into account the context data previously acquired in step S1, as well as other data where appropriate, such as time data.

The synchronization function may implement a predictive algorithmic or an artificial intelligence computation. Additionally or alternatively, the synchronization function may be configured by the user.

Thus, according to one embodiment, in the second step of the method S2, at least one network slice can be activated (step S21).

As an example, in the event that the one or more pieces of context data indicate that the doctor has a consultation scheduled for the near future and that he is outside his office, it may be useful to activate a first network slice TR1 providing a suitable network service. The first network slice may, for example, allow the doctor to obtain a satisfactory connection (in terms of speed, security, or other factors) to the telecommunications network R although he is out of the office.

Conversely, in the case where the piece or pieces of context data indicate that the doctor has a consultation scheduled for the near future but he is in his office, it may be preferable to activate a second network slice TR2, different from the first network slice TR1 and providing a different service.

In addition, if the doctor's calendar indicates that he is to conduct a simple consultation followed by a medical specialty consultation requiring the use of telemedicine tools in his office, it may be preferable to activate the second slice for the simple consultation and/then activate a third network slice TR3, different from the first and second network slices TR1, TR3, for the time period of the specialty consultation. The third network slice TR3 may for example allow the doctor to use several telemedicine devices or tools together on the same terminal 1, which is not possible or is more difficult with the other two slices TR1, TR2.

According to one embodiment, in the second step of the method S2, at least one network slice is deactivated (step S22).

As an example, when a telemedicine consultation is finished, it may be useful to deactivate a network slice because the service provided by it is no longer likely to be used by the doctor, at least in the near future.

According to another example, it may be useful, during the second step of the method S2, to deactivate a network slice and to activate, simultaneously or successively, another network slice.

Reference is now made more particularly to [FIG. 1] and [FIG. 3] which illustrate the functions of a terminal 1 or of a device 2 for supervising access configured to implement the various steps of the method for activation or deactivation as respectively described above according to two different embodiments.

According to the first embodiment, illustrated by [FIG. 1], the method for activation or deactivation is implemented directly by the terminal 1.

To this end, the terminal 1 comprises a context data reader 3 suitable for acquiring context data DATA1, DATA2, DATA3 according to the first step S1 of the method.

The terminal 1 further comprises a network 4 slice activation/deactivation member, adapted to activate or deactivate a network slice TR1, TR2, TR3 for the terminal 1 according to the second step S2 of the method.

According to the second embodiment, illustrated by [FIG. 3], the method for activation and/or deactivation is implemented by a device 2 for supervising access to the telecommunications network R.

The device 2 for supervising access is in wired or wireless communication with a plurality of terminals 1A, 1B, 1C, 1D.

The plurality of terminals 1A, 1B, 1C, 1D are connected to the same telecommunications network R that comprises the network slices.

According to this second embodiment, the activation or deactivation of network slots for the terminals 1A, 1B, 1C, 1D is supervised by the device 2 for supervising access.

To this end, the device 2 for supervising access may comprise a context data reader 3 as described above in the first embodiment, to implement the first step S1 of the method.

The activation or deactivation of a network slice for each of the terminals 1A, 1B, 1C, 1D can thus be controlled by the device 2 for supervising access.

The same slice or different slices of the network can be activated on the different terminals 1A, 1B, 1C, 1D. To this end, an activation/deactivation member can be provided at the device 2 for supervising access or at each terminal 1A, 1B, 1C, 1D.

The disclosure is not limited to the embodiments described above and represented, from which other modes and forms of embodiments can be envisaged without departing from the scope of the disclosure.

Advantages

The activation/deactivation ensures that as long as the network slice is not activated, it is not making use of any device in the network. Thus, if these devices are equipped with a standby function, they can switch to standby and save network resources as long as they are not in use.

As already indicated above, it is thus possible to offer the user a network service provided by a network slice adapted to his current or future needs, which allows making better use of the resources of the telecommunications network R over time and optimizing the associated costs for the user.

The automatic acquisition of context data simplifies management of the telecommunications network, as the user does not have to take the steps necessary to activate or deactivate a network slice.

Since the context data are advantageously acquired in real time, the network slice, and therefore the service provided to the user, is adapted over time.

Although the present disclosure has been described with reference to one or more examples, workers skilled in the art will recognize that changes may be made in form and detail without departing from the scope of the disclosure and/or the appended claims.

The invention claimed is:
1. A method comprising:
   activation or deactivation, for a terminal, of a virtual subset of a telecommunications network referred to as a "network slice," dedicated to a service, the telecommunications network comprising a plurality of network slices, the terminal being connected to the telecommunications network, and the activation or deactivation being implemented by the terminal and comprising at least:
   a) acquiring at least one piece of context data of a user, and
   b) activating or deactivating at least one network slice among the plurality of network slices, on the basis of the previously acquired piece of context data,
   wherein at least a first network slice is activated beforehand for the terminal, prior to implementation of the acquiring in a), and wherein the first network slice is deactivated during the activating or deactivating in b).

2. The method according to claim 1, wherein a second network slice that is different from the first network slice is activated during b).

3. The method according to claim 1, wherein the network slices each comprise different parameter values, the parameters being selected from a data transfer rate, geographical coverage, number of connected terminals, level of security, cost of the service, latency, quality of service, and frequency used by the network slice.

4. The method according to claim 1, wherein the piece of context data is a piece of geolocation data of the user.

5. The method according to claim 1, wherein the piece of context data is a piece of data associated with an activity of the user.

6. The method according to claim 1, wherein the piece of context data is acquired automatically during a).

7. A terminal for activation or deactivation of a virtual subset of a telecommunications network referred to as a "network slice," dedicated to a service, the telecommunications network comprising a plurality of network slices, the terminal comprising:
   a context data reader configured to acquire at least one piece of context data of a user while the terminal is connected to the telecommunications network, and
   an activation/deactivation member configured to:
      activate or deactivate at least one network slice among the plurality of network slices, on the basis of the previously acquired piece of context data, while the terminal is connected to the telecommunications network;
      activate at least a first network slice beforehand for the terminal, prior to the context data reader acquiring the at least one piece of context data; and
      deactivate the first network slice during the activating or deactivating the at least one network slice.

8. A device for supervising access for activation or deactivation of a virtual subset of a telecommunications network referred to as a "network slice," dedicated to a service, the telecommunications network comprising a plurality of network slices, the device for supervising access being in communication with a plurality of terminals and comprising:
   a context data reader configured to acquire at least one piece of context data of a user while at least one of the plurality of terminals is connected to the telecommunications network,
   the device for supervising access being configured to:
      activate or deactivate a network slice for the plurality of terminals on the basis of the previously acquired piece of context data, while at least one of the plurality of terminals is connected to the telecommunications network;
      activate at least a first network slice beforehand for the plurality of terminals, prior to the context data reader acquiring the at least one piece of context data; and
      deactivate the first network slice during the activating or deactivating the at least one network slice.

9. A non-transitory storage medium readable by a terminal, on which code instructions of a computer program are stored, which when executed by the terminal configure the terminal to implement a method for activation or deactivation, for the terminal, of a virtual subset of a telecommunications network referred to as a "network slice," dedicated to a service, the telecommunications network comprising a plurality of network slices, the terminal being connected to the telecommunications network during the method, and the method comprising at least:
   a) acquiring at least one piece of context data of a user, and
   b) activating or deactivating at least one network slice among the plurality of network slices, on the basis of the previously acquired piece of context data,
   wherein at least a first network slice is activated beforehand for the terminal, prior to implementation of the acquiring in a), and wherein the first network slice is deactivated during the activating or deactivating in b).

* * * * *